United States Patent
Sheppard et al.

(10) Patent No.: US 12,058,244 B2
(45) Date of Patent: Aug. 6, 2024

(54) PREVENTION OF RACE CONDITIONS IN A DUAL-SERVER STORAGE SYSTEM FOR GENERATION OF ENCRYPTION KEY

(71) Applicant: INTERNATIONAL BUSINESS MACHINES CORPORATION, Armonk, NY (US)

(72) Inventors: Jacob Lee Sheppard, Corona de Tucson, AZ (US); Igor Popov, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 17/470,873

(22) Filed: Sep. 9, 2021

(65) Prior Publication Data

US 2023/0070163 A1     Mar. 9, 2023

(51) Int. Cl.
H04L 29/06     (2006.01)
H04L 9/08     (2006.01)

(52) U.S. Cl.
CPC ............ H04L 9/0825 (2013.01); H04L 9/085 (2013.01); H04L 9/0894 (2013.01)

(58) Field of Classification Search
CPC ...... H04L 9/0825; H04L 9/085; H04L 9/0894
See application file for complete search history.

(56) References Cited

U.S. PATENT DOCUMENTS

| | | | |
|---|---|---|---|
| 9,166,782 B2 | 10/2015 | Boren et al. | |
| 2007/0076889 A1* | 4/2007 | DeRobertis | H04L 9/083 380/279 |
| 2009/0327798 A1 | 12/2009 | D'Amato et al. | |
| 2010/0077249 A1 | 3/2010 | Das et al. | |
| 2012/0272051 A1* | 10/2012 | Chittigala | H04L 63/045 380/278 |
| 2013/0322431 A1* | 12/2013 | Wood | H04M 3/42153 370/352 |
| 2018/0337772 A1 | 11/2018 | Acar et al. | |
| 2020/0279060 A1* | 9/2020 | McGraw | G06F 21/6209 |
| 2021/0028936 A1* | 1/2021 | Shaw | G06F 16/182 |
| 2021/0266161 A1 | 8/2021 | Zee et al. | |
| 2021/0306164 A1 | 9/2021 | Wei et al. | |
| 2022/0278963 A1* | 9/2022 | Venkataraman | H04L 63/00 |

FOREIGN PATENT DOCUMENTS

| | | |
|---|---|---|
| CN | 106708911 A | 5/2017 |
| CN | 107094138 A | 8/2017 |
| CN | 110678865 A | 1/2020 |
| CN | 111095899 B | 12/2021 |

OTHER PUBLICATIONS

PCT International Search Report and Written Opinion dated Sep. 28, 2022, 9 pp., for Application No. PCT/CN2022/103280.

* cited by examiner

*Primary Examiner* — Evans Desrosiers
(74) *Attorney, Agent, or Firm* — KONRAD, RAYNES, DAVDA & VICTOR LLP; Rabindranath Dutta

(57) ABSTRACT

A first node and a second node are configured in a storage system, wherein the first node and the second node are communicatively coupled to a key server. One or more nodes of a set comprising the first node and the second node initiate a process to generate an encryption key to be shared between the first node and the second node in the storage system. A request for the encryption key is transmitted to the key server, from the one or more nodes of the set comprising the first node and the second node, in response to securing a common lock that is available.

18 Claims, 12 Drawing Sheets

PREVENTION OF RACE CONDITIONS IN A DUAL-SERVER STORAGE SYSTEM FOR GENERATION OF ENCRYPTION KEY

BACKGROUND

1. Field

Embodiments relate to the prevention of race conditions in a dual-server storage system for generation of encryption key.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one of the two servers, the other server that has not failed may take over the operations performed by the failed server.

SUMMARY OF THE PREFERRED EMBODIMENTS

Provided are a method, system, and computer program product in which a first node and a second node are configured in a storage system, wherein the first node and the second node are communicatively coupled to a key server. One or more nodes of a set comprising the first node and the second node initiate a process to generate an encryption key to be shared between the first node and the second node in the storage system. A request for the encryption key is transmitted to the key server, from the one or more nodes of the set comprising the first node and the second node, in response to securing a common lock that is available.

In certain embodiments, a node waits for the common lock to be released, in response to not being able to secure the common lock.

In further embodiments, the encryption key is shared between the first node and the second node, prior to releasing the common lock.

In additional embodiments, the common lock is stored in the first node which is a master node in the storage system, wherein the second node is a partner node in the storage system, and wherein the partner node secures the common lock stored in the master node when the common lock is made available to the partner node.

In yet additional embodiments, in response to securing the common lock after waiting for the common lock, sending of another request to the key server is avoided if the encryption key is already found in a local key store.

In further embodiments, if the first node is not operational then the second node requests the key server for the encryption key as the second node is operating as the master node and has the common lock.

In yet further embodiments, enforcing exclusive possession of the common lock prevents race conditions that create conflicting encryption keys between the first node and the second node.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mechanism to prevent race conditions while generating a new key in a dual-server storage subsystem comprising a first node and a second node. The dual-server storage subsystem may be a primary storage subsystem. Internally, within a certain storage subsystem the nodes of the storage subsystem may be connected using a Peripheral Component Interconnect (PCI) bus. Externally, the primary storage subsystem, a secondary storage subsystem and a key server may be connected via Transmission Control Protocol/Internet Protocol (TCP/IP).

When a pairing is established between a primary and a secondary subsystem, the initiator subsystem requests a new key and key ID from the key server over TCP/IP. The key server generates a new key and key ID (i.e., key identifier) and passes them back to the initiator subsystem. The initiator subsystem then sends the key ID to the target subsystem.

The target subsystem requests the same key from the common key server using the key id. The key server sends to the target subsystem the key. Once both the initiator and target subsystems have a shared secret, they may use it to derive additional keys for encrypting the data in the connection between themselves.

The embodiments address the problem on the initiator side when generating a new key. The establishment of the copy services pairing between initiator and target nay happen on either node of the dual-node storage system. If the request to establish the copy services pair is received by both nodes simultaneously there is a race condition to request a key from the key server. If done simultaneously without coordination, both nodes could potentially receive a new key from the key server, and this would produce confusion over which key to use between the primary and secondary storage subsystems as the shared secret for purposes of encryption of data in flight.

In certain embodiments when one of the nodes in a dual-node storage system begins the process of establishing a copy services pairing, it obtains a common lock which is housed on the first node. Then after each node gets the lock, it will check to see if it has already received the key. In cases where there is a race, the node that wins the race gets the new key and stores it on both the local and remote node before relinquishing the lock. By the time the losing node gets the lock, the key will be populated in its key store. If after getting common lock, the key is found in the local key store, then it is not necessary to get a new key and the node uses the existing one as the shared secret. As a result, certain embodiments improve the operations of a computational device comprising a dual-server storage system.

Exemplary Embodiments

Figure 1:
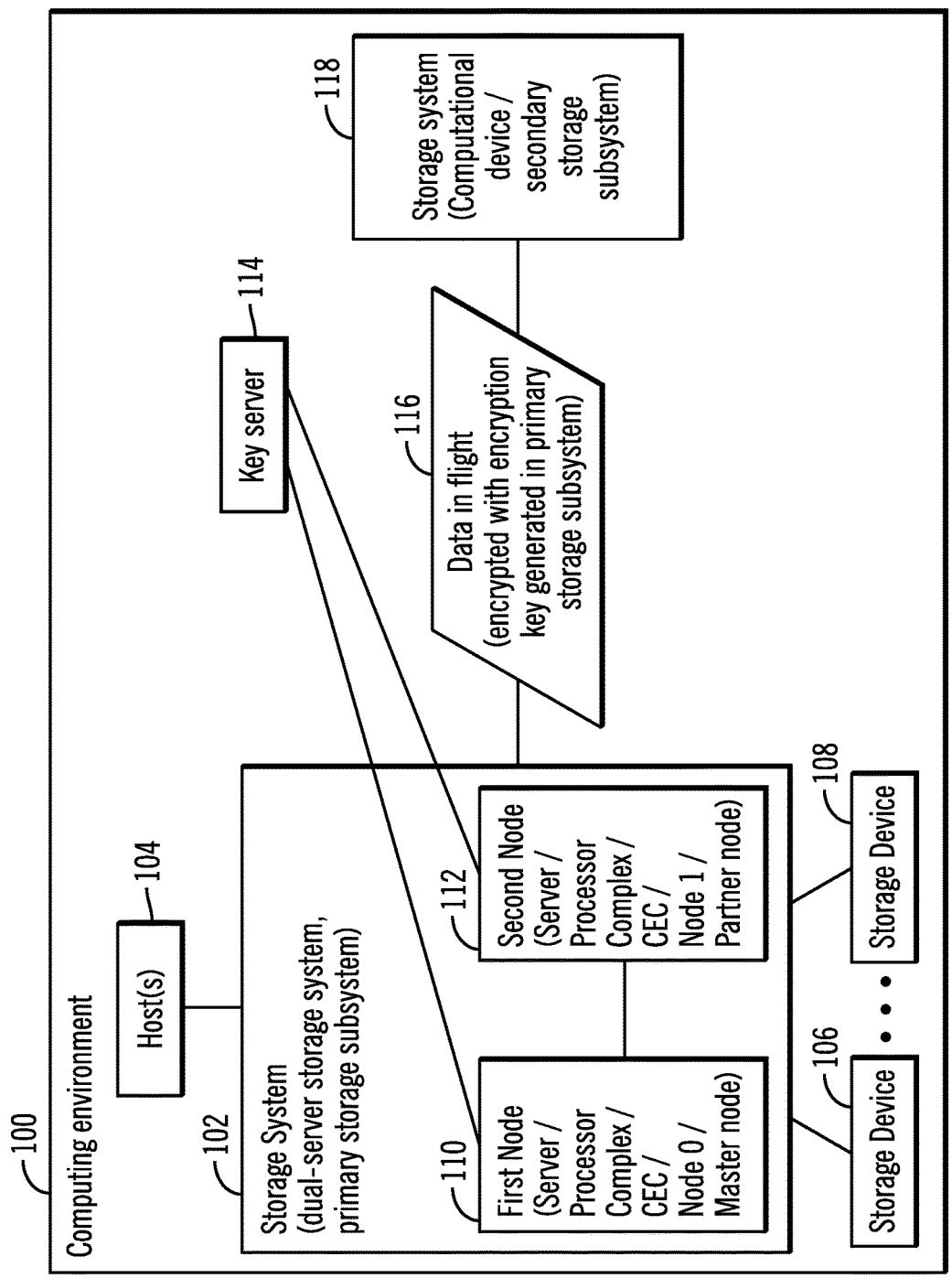
FIG. 1 illustrates a block diagram of a computing environment for the prevention of race conditions in a dual-server storage system for generation of encryption key, in accordance with certain embodiments.

FIG. 1 illustrates a block diagram 100 of a computing environment for prevention of race conditions in a dual-server storage system for generation of encryption key, in accordance with certain embodiments.

A storage system 102 allows one or more hosts 104 to perform input/output (I/O) operations with data stored in a plurality of storage device 106, 108, The storage system 102 is a dual-server storage system where the two servers 110, 112 provide redundancy and prevent data loss in the event of a failure of one or the two servers 110, 112. The severs 110, 112 may be referred to as a first node and a second node and may comprise a processor complex or a Central Electronics Complex (CEC), where the first node 110 may be referred to as Node 0 or as master node, and where the second node 112 may be referred to as the Node 1 or partner node. In the event of a failure of the first node 110, the second node 112 takes over the operations of the first node 110, and in the event of a failure of the second node 112, the first node 110 takes over the operations of the second node 112. The storage system 102 may also be referred to as a storage controller, a dual-server storage system or a primary storage subsystem.

The first node 110 and the second node 112 may need to generate an encryption key for encrypting data in flight (reference numeral 116) between the first storage subsystem 102 and a second storage subsystem 118, where the second storage subsystem 118 is a computational device. The encryption key is provided by a key server 114 to which the first node 110 and the second node 112 are communicatively coupled. The data in flight 116 is between the storage system 102 and another storage system 118 or another computer system. It should be noted that the data in flight 116 is external to the storage system 102 and encrypted with an encryption key that should be the same for encryption by the first node 110 and the second node 112, if the first node 110 and the second node 112 are to substitute one another in the event of a failure of one of the nodes.

The storage systems 102, 118, the nodes 110, 112, the key server 114, and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of nodes 110, 112 (i.e., servers) may provide redundancy because if one server undergoes a failure from which recovery is not possible, an alternate server may perform the functions of the server that failed. Each of the plurality of servers 110, 112 may be referred to as a processing complex or a CEC as described earlier and may include one or more processors and/or processor cores.

The storage systems 102, 118, the nodes 110, 112, the key server 114, and the hosts 104 may be elements in any suitable network, such as, a storage area network, a wide area network, the Internet, an intranet. In certain embodiments, storage system 102, the storage system 102, the nodes 110, 112, the key server 114, and the hosts 104 may be elements in a cloud computing environment.

In certain embodiments, mechanisms are provided to ensure that race conditions do not occur between the first node 110 and the second node 112 when encryption keys are concurrently generated by both nodes.

Figure 2:
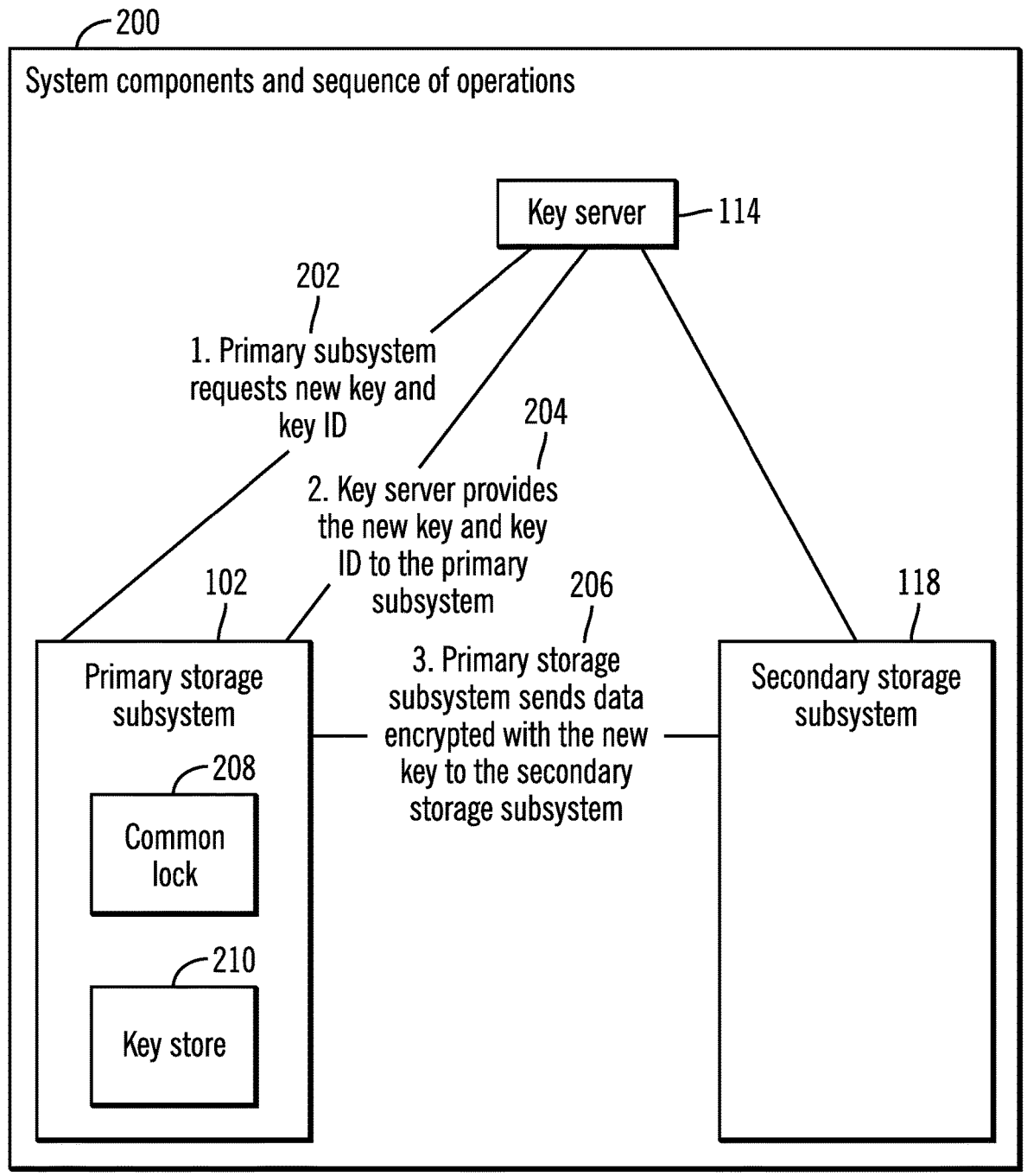
FIG. 2 illustrates a block diagram of certain system components and sequence of operations, in accordance with certain embodiments.

FIG. 2 illustrates a block diagram 200 of certain system components and sequence of operations, in accordance with certain embodiments.

A primary storage subsystem 102 (dual-server storage subsystem) requests (reference numeral 202) a new key (the key is an encryption key) and a key identifier (ID) from the key server 114. The key server 114 receives the request from the primary storage subsystem 102 and generates the new key and key ID before sending (reference numeral 204) the new key and the key ID to the primary storage subsystem 102. Subsequently, the primary storage subsystem 102 sends data in flight encrypted with the new key (reference numeral 206) to the secondary subsystem 118

The primary subsystem 102 includes a data structure for a common lock 208 and a key store 210 that stores the new key received from the key server 114.

Figure 3:
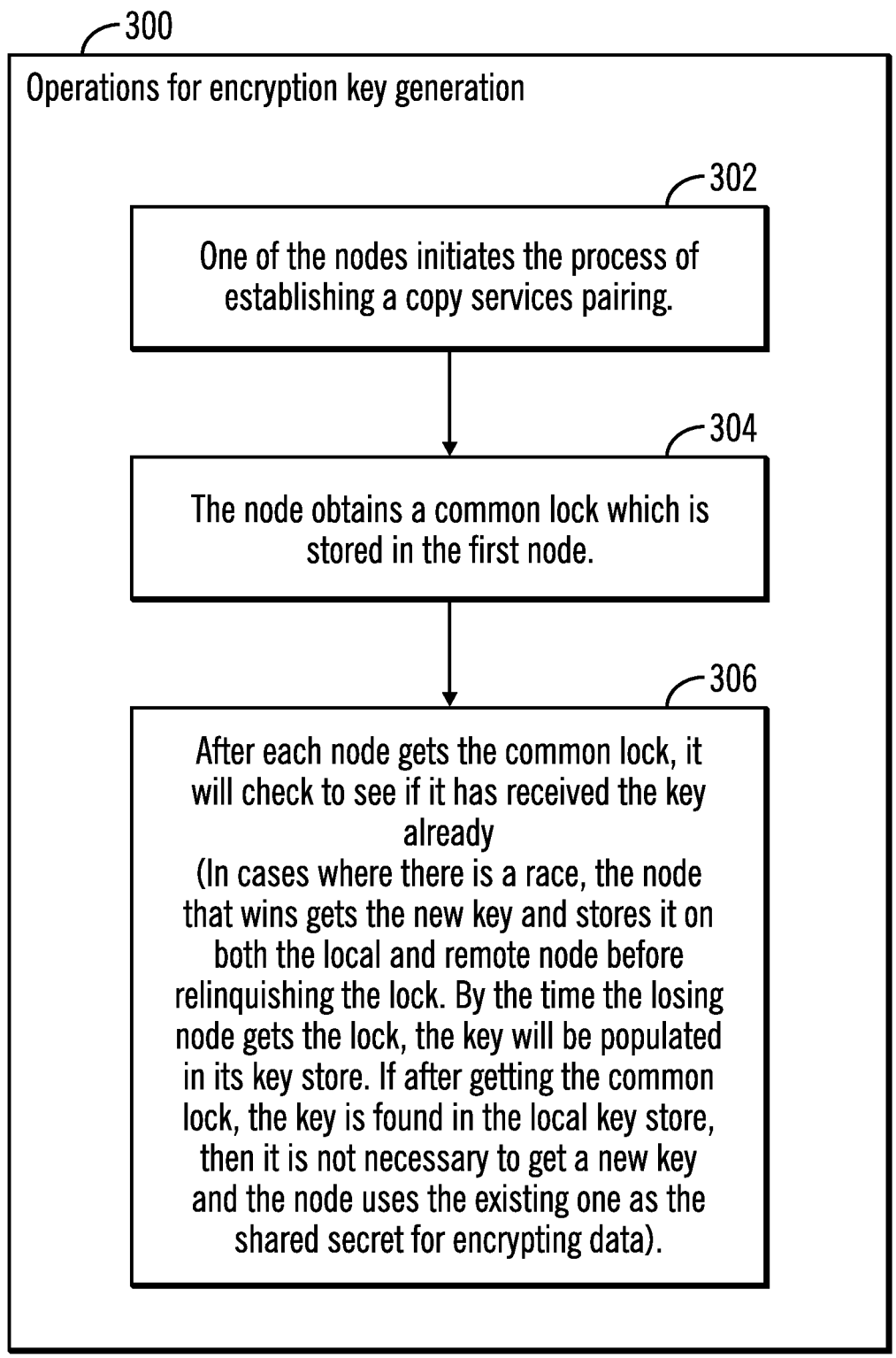
FIG. 3 illustrates a flow chart that shows operations for the generation of encryption key, in accordance with certain embodiments.

FIG. 3 illustrates a flow chart 300 that shows operations for the generation of encryption key, in accordance with certain embodiments. In certain embodiments, the operations shown in FIG. 3 may be performed by an application implemented in hardware, firmware, software, or any combination thereof in the storage system 102.

Control starts at block 302 in which one of the nodes in a dual-node storage system 102 begins the process of establishing a copy services pairing. The copy services pairing ensures that both nodes of the dual-node storage system (same as dual-server storage system) are paired with each other such that if one node fails then the other node has a copy of the data needed to operate the dual-node storage system 102 without loss of any data.

From block 302 control proceeds to block 304 in which the node obtains the common lock which is housed on the first node (i.e., the master node which is node 0) 110. Then at block 306, after each node gets the lock, it will check to see if it has received the key already. In cases where there is a race, the node that wins gets the new key and stores it on both the local and remote node before relinquishing the lock. By the time the losing node gets the lock, the key will be populated in its key store. If after getting the common lock, the key is found in the local key store, then it is not necessary to get a new key and the node uses the existing key in the local key store as the shared secret for encrypting data.

Figure 4:
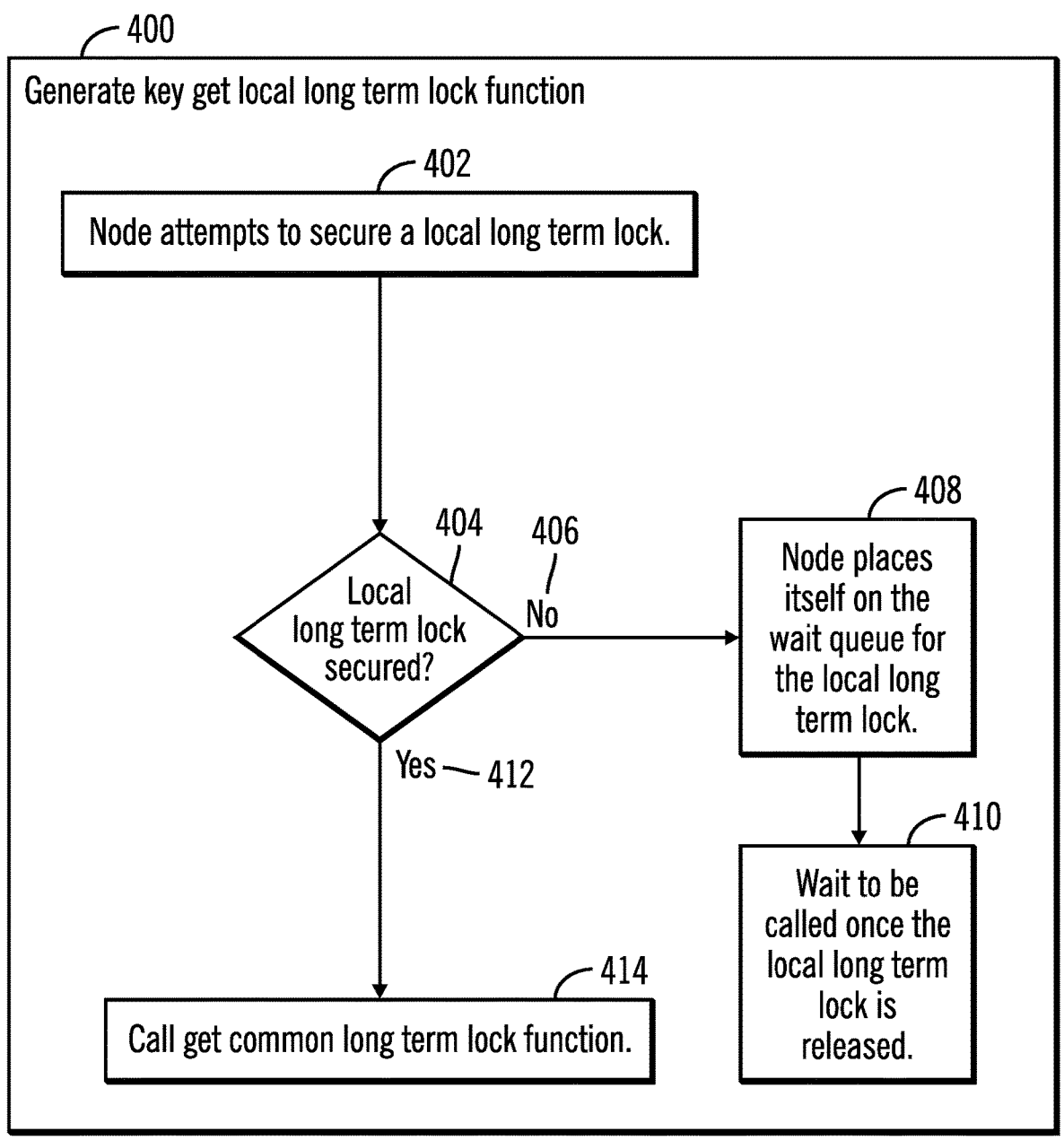
FIG. 4 illustrates a flow chart that shows operations to perform generate key get local long term lock function, in accordance with certain embodiments.

FIG. 4 illustrates a flow chart 400 that shows operations to perform generate key get local long term lock function, in accordance with certain embodiments. In certain embodiments, the operations shown in FIG. 4 may be performed by an application implemented in hardware, firmware, software or any combination thereof in the storage system 102.

Control starts at block 402 in which a node attempts to secure a local long term lock. A determination is made at block 404 as to whether the local long term lock has been secured. If not ("No" branch 406) then control proceeds to block 408 in which the node places itself on the wait queue for the local long term lock and waits (at block 410) to be called once the local long term lock is released.

If at block 404, it is determined that the local long term lock has been secured ("Yes" branch 412) then control proceeds to block 414 in which the process calls a get common long term lock function.

Figure 5:
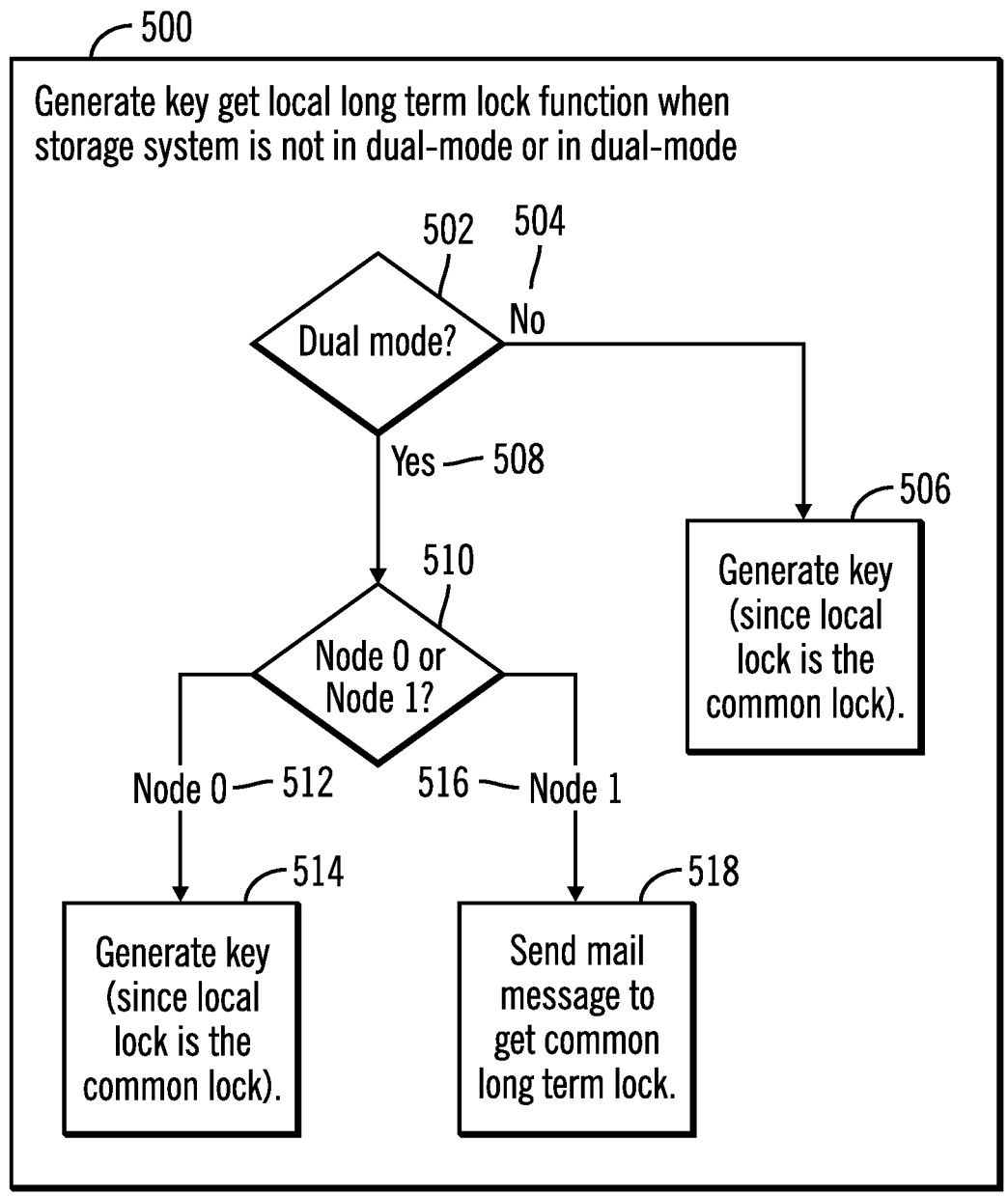
FIG. 5 illustrates a flow chart that shows operations to perform generate key get common long term lock function depending on whether the storage system is not in dual-mode or is in dual-mode, in accordance with certain embodiments.

FIG. 5 illustrates a flow chart 500 that shows operations to perform generate key get common long term lock function depending on whether storage system is not in dual-mode or is in dual-mode, in accordance with certain embodiments. In certain embodiments, the operations shown in FIG. 5 may be performed by an application implemented in hardware, firmware, software or any combination thereof in the storage system 102.

At block 502 a determination is made as to whether the storage system 102 is operational in dual mode, where dual mode operation means that both nodes of the storage system 102 are operational, and the storage system 102 is not operational in dual mode when one of the two nodes of the storage system 102 is no longer operational.

At block 502 if a determination is made that the storage system 102 is not in dual mode ("No" branch 504) then control proceeds to block 506 in which the node generates a key from the key store since the local lock is the common lock with only one node being operational and the process returns.

If at block 502, a determination is made that the storage system 102 is operational in dual mode ("Yes" branch 508") then control proceeds to block 510 in which a determination is made as to whether the node performing the process of FIG. 5 is node 0 (the master node 110) or node 1 (the partner node 112). If the node is node 0 (shown by branch 512) then control proceeds to block 514 in which the key is generated since the local lock is the common lock. If the node is node 1 (shown by branch 516) then control proceeds to block 518 in which a mail message is sent to get the common long term lock.

Figure 6:
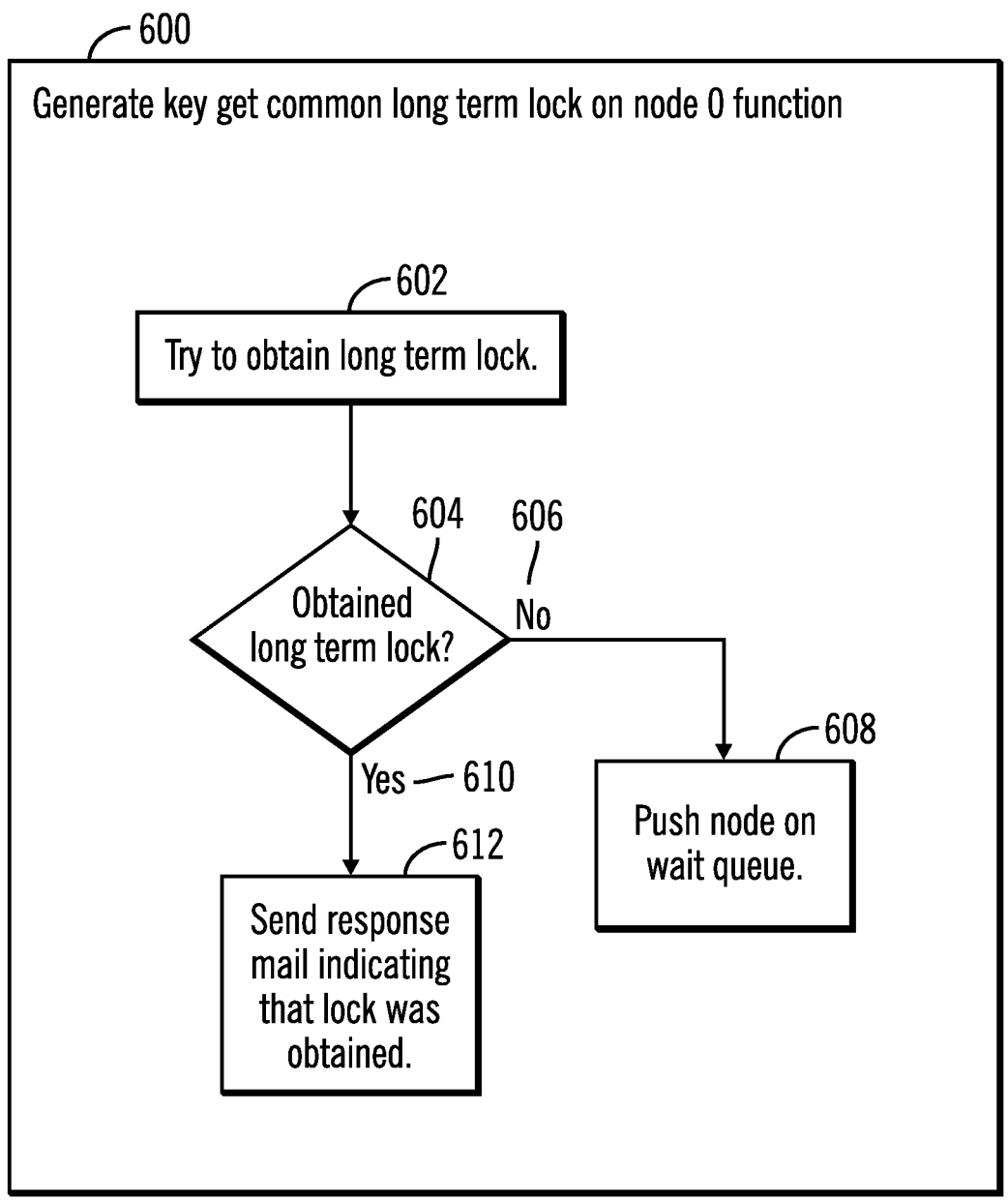
FIG. 6 illustrates a flow chart that shows operations to perform generate key get common long term lock on node 0 function, in accordance with certain embodiments.

FIG. 6 illustrates a flow chart 600 that shows operations to perform generate key get common long term lock on node 0 function, in accordance with certain embodiments. In certain embodiments, the operations shown in FIG. 6 may be performed by an application implemented in hardware, firmware, software or any combination thereof in the storage system 102.

Control starts at block 602 in which a node tries to obtain a long term lock. Control proceeds to block 604 in which a determination is made as to whether the long term lock has been obtained. If not ("No" branch 606), the node is pushed (at block 608) to a wait queue.

If at block 604 it is determined that the long term lock has been obtained ("Yes" branch 610) then control proceeds to block 612 in which the node sends a response mail that indicates that the lock was obtained.

Figure 7:
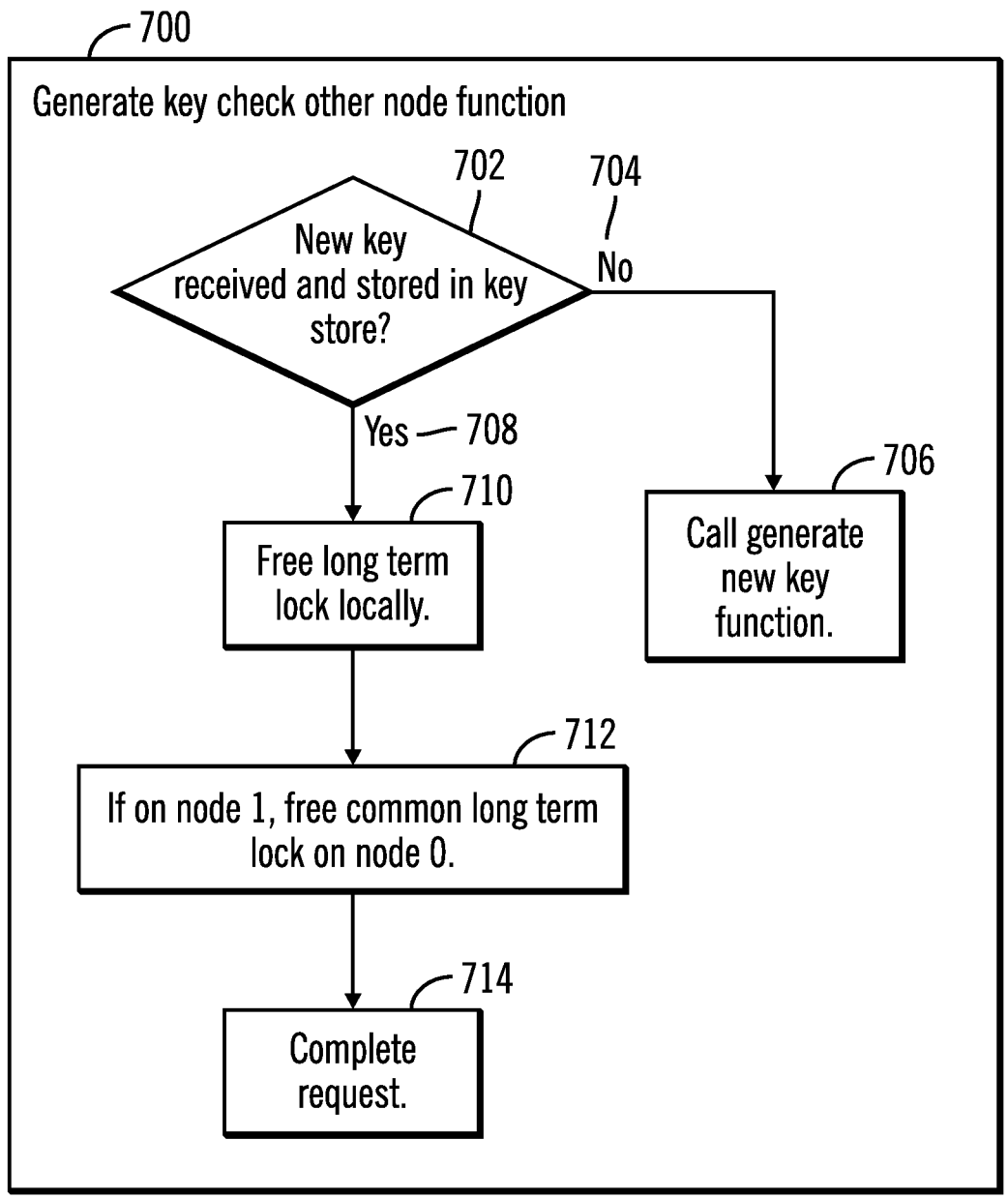
FIG. 7 illustrates a flow chart that shows operations to perform generate key check other node function, in accordance with certain embodiments.

FIG. 7 illustrates a flow chart 700 that shows operations to perform generate key check other node function, in accordance with certain embodiments. In certain embodiments, the operations shown in FIG. 7 may be performed by an application implemented in hardware, firmware, software or any combination thereof in the storage system 102.

The function shown in FIG. 7 is called after the common long term lock is obtained on node 0. If concurrent new key requests are received from both nodes then the winning node gets the key, stores it in its own key store, mails it to the partner, stores it in the partner's key store, and then releases the lock. The purpose of this function is to check the situation when the node took part in and lost the above race for the key, or in other words, if the key has already been placed in the key store while the node was waiting for the lock. If so, then the node only needs to switch to using this new key. Otherwise, the node proceeds to the next operation and generates the new key.

Control starts at block 702 in which a determination is made as to whether a new key has been received and stored in the key store. If the new key has not been received and stored in key store ("No" branch 704) control proceeds to block 706 where the generate new key function is called.

If the new key has been received and stored in the key store ("Yes" branch 708), then control proceeds to block 710 where the long term lock is freed locally. If on node 1, then the common long term lock is freed (at block 712) on node 0 and the request is completed (at block 714).

Figure 8:
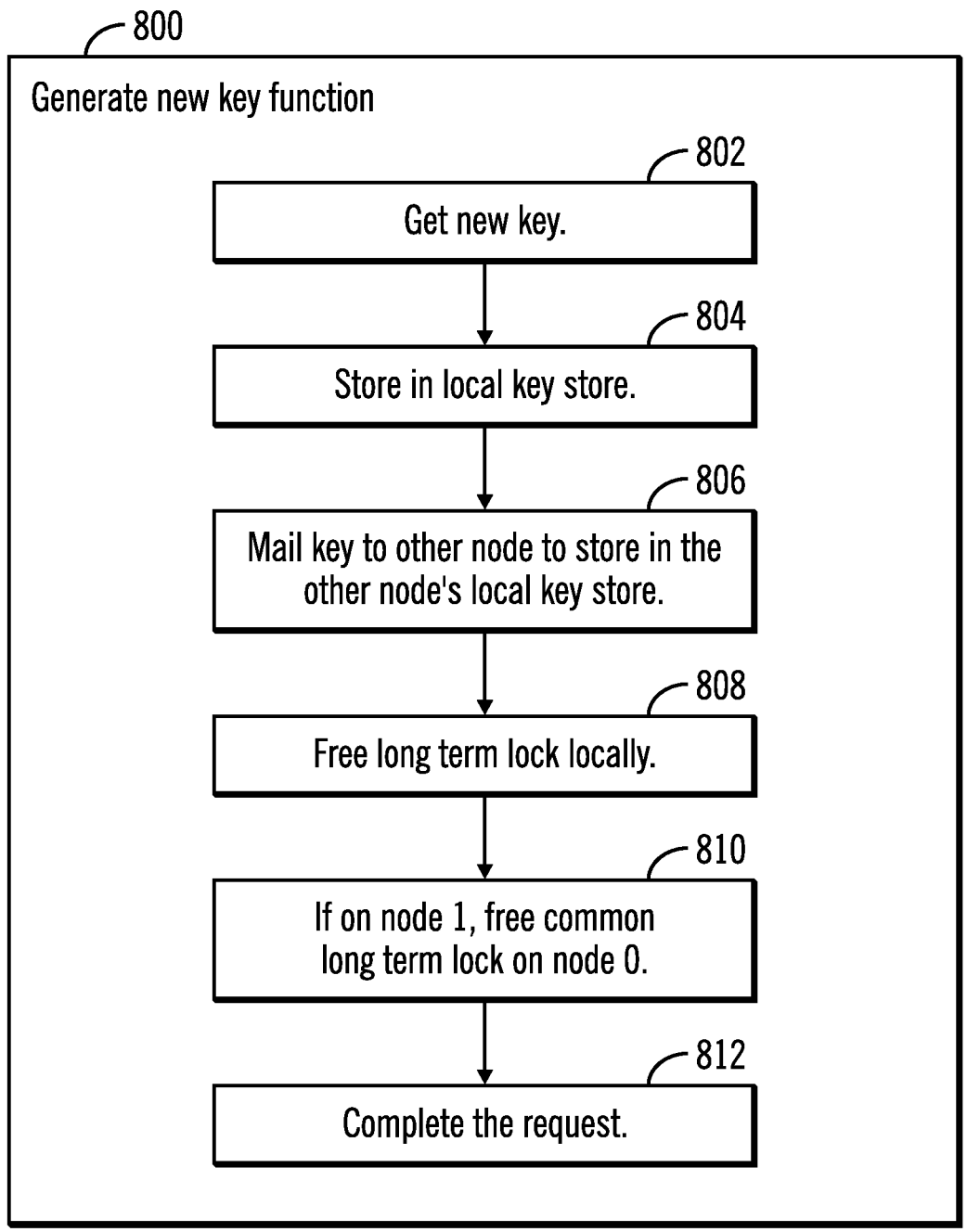
FIG. 8 illustrates a flow chart that shows operations to perform a "generate new key" function, in accordance with certain embodiments.

FIG. 8 illustrates a flow chart 800 that shows operations to perform a "generate new key" function, in accordance with certain embodiments. In certain embodiments, the operations shown in FIG. 8 may be performed by an application implemented in hardware, firmware, software or any combination thereof in the storage system 102.

The function shown in FIG. 8 is called after the common long term lock on the node is obtained and it is validated that the long term lock was not already received by the other node. The node gets a new key, stores it in its own key store, mails it to the partner, stores it in the partner's key store, and then releases the lock.

Control starts at block 802 in which a new key is obtained, and then stored (at block 804) in the local key store. The key is then mailed (at block 806) to the other node to store in the other node's local key store and the long term lock is freed locally (at block 808), and if on node 1 then the common long term lock on node 0 is freed (at block 810) and the request is completed (block 812).

Figure 9:
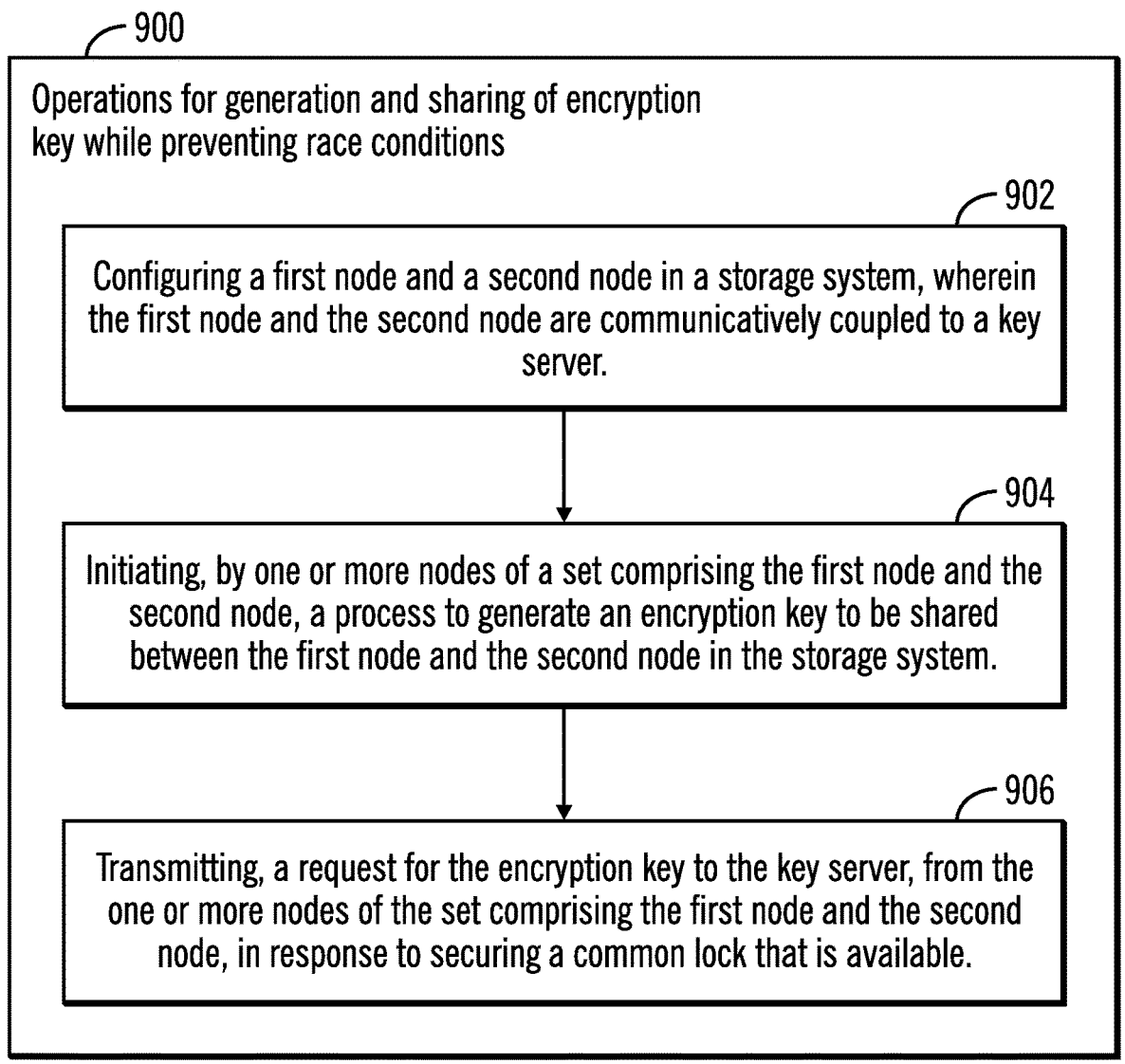
FIG. 9 illustrates a flow chart that shows operations for generation and sharing of encryption key while preventing race conditions, in accordance with certain embodiments.

FIG. 9 illustrates a flow chart 900 that shows operations for generation and sharing of encryption key while preventing race conditions, in accordance with certain embodiments. In certain embodiments, the operations shown in FIG. 9 may be performed by an application implemented in hardware, firmware, software or any combination thereof in the storage system 102.

A first node 110 and a second node 112 are configured (at block 902) in a storage system 102, wherein the first node and the second node are communicatively coupled to a key server.

From block 902 control proceeds to block 904 in which one or more nodes of a set comprising the first node 110 and the second node 112 initiate a process to generate an encryption key to be shared between the first node 110 and the second node 112 in the storage system 102. A request for the encryption key is transmitted (at block 906) to the key server 114, from the one or more nodes of the set comprising the first node 110 and the second node 112, in response to securing a common lock that is available.

Therefore, FIGS. 1-9 illustrate certain embodiments for the prevention of race condition in a dual-server storage system for generation of encryption key, in order to improve the performance of the dual-server storage system 102.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
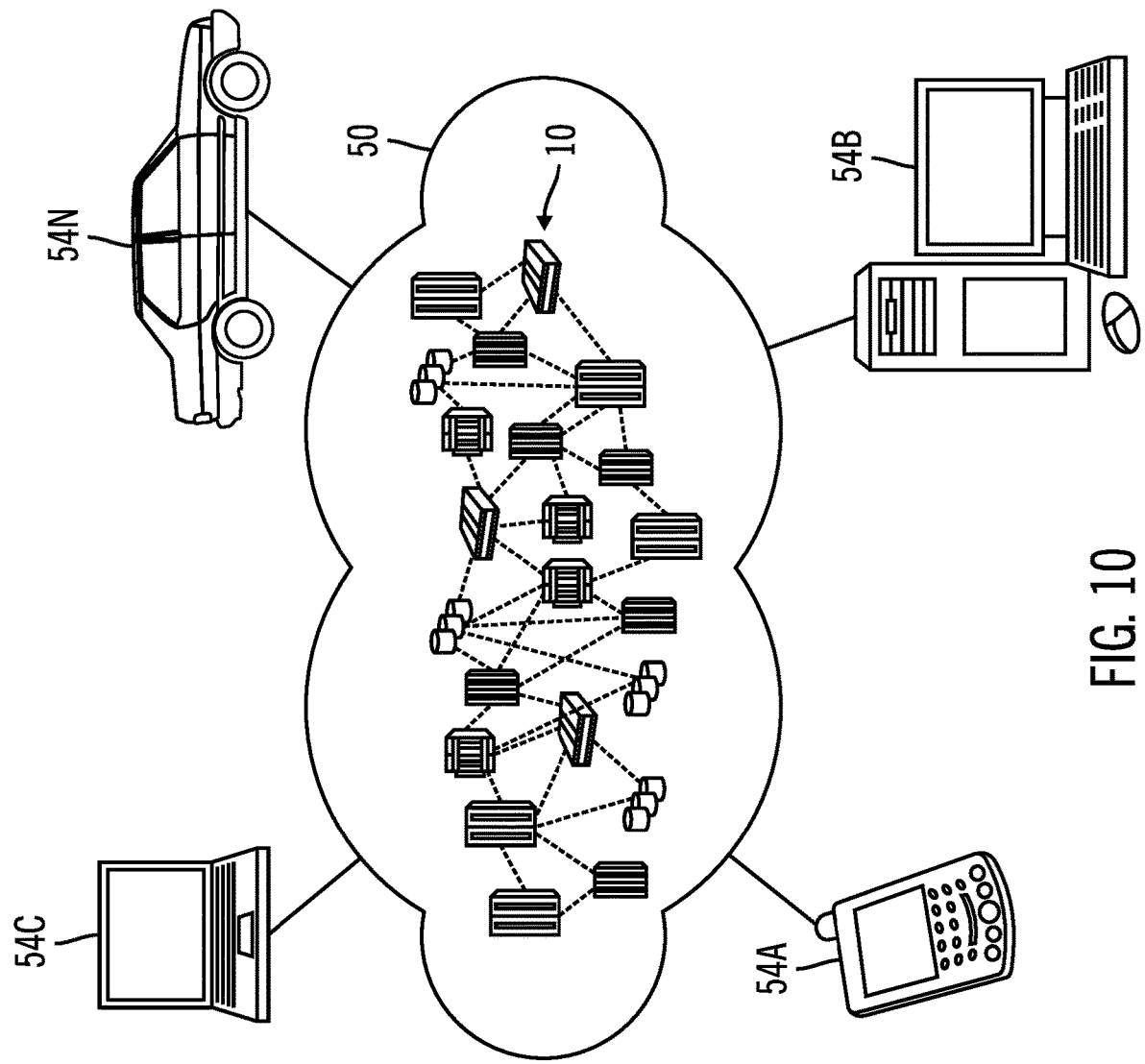
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
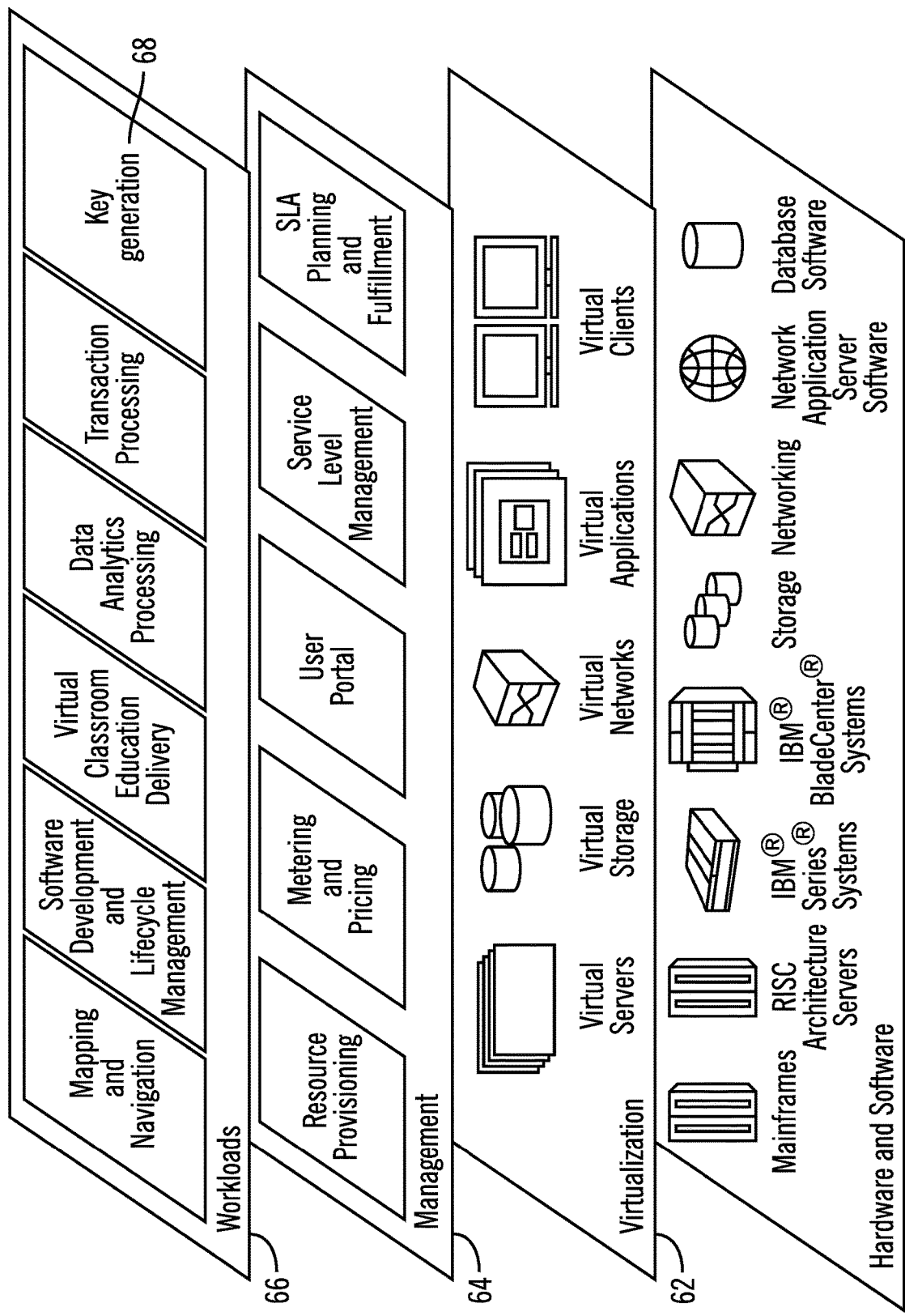
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

* IBM, z/OS, zSeries, pSeries, xSeries, BladeCenter, Web Sphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and key generation 68 as shown in FIGS. 1-11.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
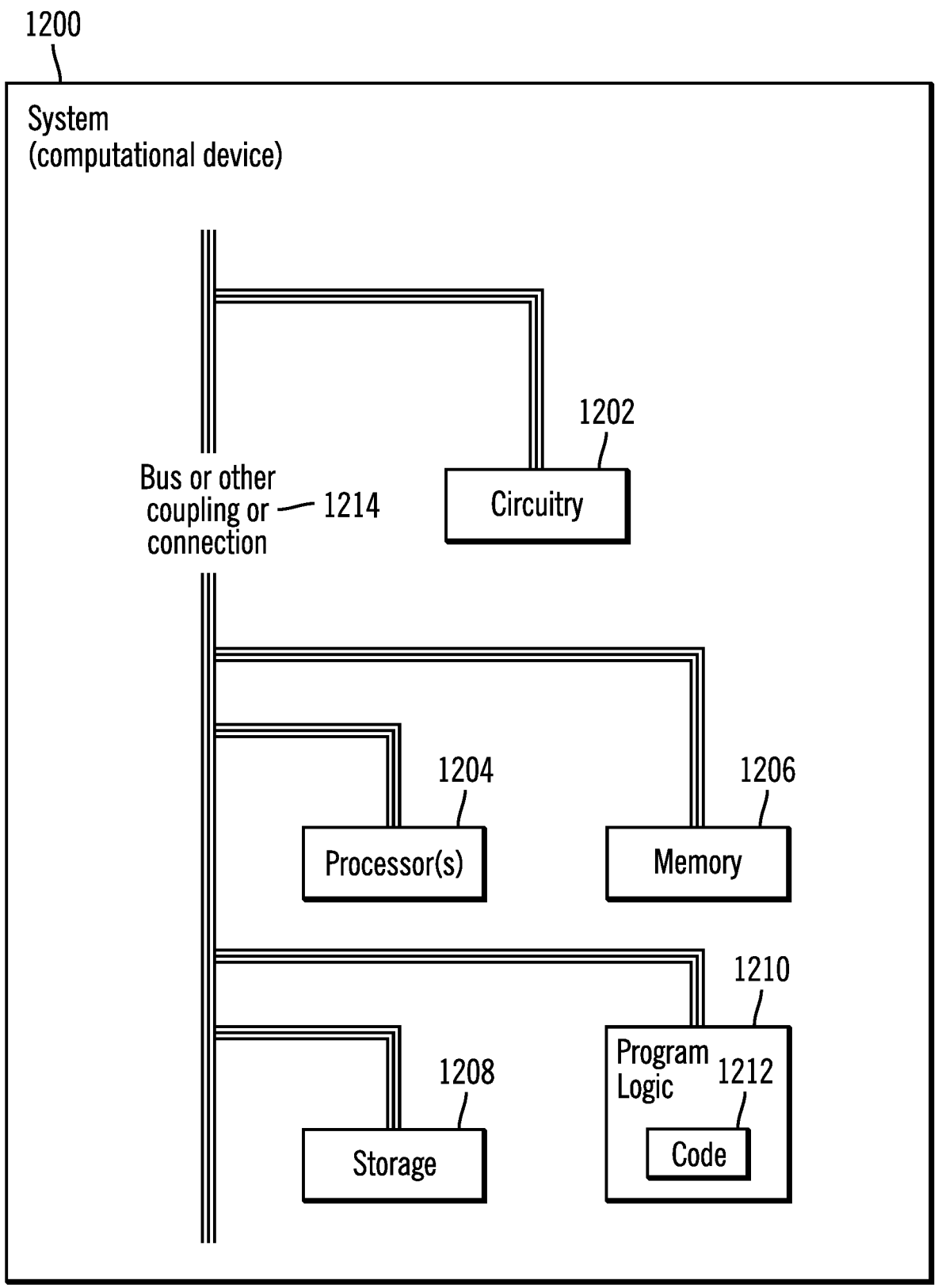
FIG. 12 illustrates a block diagram of a computational system that shows certain elements that may be included in the computational devices described in FIGS. 1-11, in accordance with certain embodiments.

FIG. 12 illustrates a block diagram that shows certain elements that may be included in the storage system 102, the nodes 110, 112, the key server 114, and the hosts 104, in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring a first node and a second node in a dual-server storage system comprising a primary storage subsystem that is coupled to a secondary storage subsystem, wherein the dual-server storage system is coupled to a host, and wherein the first node and the second node are communicatively coupled to a key server; and
transmitting, a request for an encryption key to the key server, from one or more nodes of a set comprising the first node and the second node, in response to exclusively securing a common lock that is available, wherein the encryption key is to be shared between the first node and the second node in the dual-server storage system, wherein enforcing exclusive possession of the common lock prevents race conditions that create conflicting encryption keys between the first node and the second node, and wherein the encryption key is used to encrypt data from the dual-server storage system comprising the primary storage subsystem to the secondary storage subsystem.

2. The method of claim 1, the method further comprising:
determining whether the common lock is secured; and
in response to determining that the common lock is not secured, placing one of the first node and the second node in a wait queue.

3. The method of claim 2, the method further comprising:
sharing the encryption key between the first node and the second node, prior to releasing the common lock.

4. The method of claim 3, wherein the common lock is stored in the first node which is a master node in the dual-server storage system, wherein the second node is a partner node in the storage system, and wherein the partner node secures the common lock stored in the master node when the common lock is made available to the partner node.

5. The method of claim 4, the method further comprising:
in response to securing the common lock, avoiding sending another request to the key server if the encryption key is already found in a local key store.

6. The method of claim 5, wherein:
if the first node is not operational then the second node requests the key server for the encryption key as the second node is operating as the master node and has the common lock.

7. A system, comprising:
a memory; and
a processor coupled to the memory, wherein the processor performs operations, configuring a first node and a second node in a dual-server storage system comprising a primary storage subsystem that is coupled to a secondary storage subsystem, wherein the dual-server storage system is coupled to a host, and wherein the first node and the second node are communicatively coupled to a key server; and
transmitting, a request for an encryption key to the key server, from one or more nodes of a set comprising the first node and the second node, in response to exclusively securing a common lock that is available, wherein the encryption key is to be shared between the first node and the second node in the dual-server storage system, wherein enforcing exclusive possession of the common lock prevents race conditions that create conflicting encryption keys between the first node and the second node, and wherein the encryption key is used to encrypt data from the dual-server storage system comprising the primary storage subsystem to the secondary storage subsystem.

8. The system of claim 7, the operations further comprising:
   determining whether the common lock is secured; and
   in response to determining that the common lock is not secured, placing one of the first node and the second node in a wait queue.

9. The system of claim 8, the operations further comprising:
   sharing the encryption key between the first node and the second node, prior to releasing the common lock.

10. The system of claim 9, wherein the common lock is stored in the first node which is a master node in the dual-server storage system, wherein the second node is a partner node in the system, and wherein the partner node secures the common lock stored in the master node when the common lock is made available to the partner node.

11. The system of claim 10, the operations further comprising:
   in response to securing the common lock, avoiding sending another request to the key server if the encryption key is already found in a local key store.

12. The system of claim 11, wherein:
   if the first node is not operational then the second node requests the key server for the encryption key as the second node is operating as the master node and has the common lock.

13. A computer program product, the computer program product comprising a computer readable storage medium having computer readable program code embodied therewith, the computer readable program code configured to perform operations, the operations comprising:
   configuring a first node and a second node in a dual-server storage system comprising a primary storage subsystem that is coupled to a secondary storage subsystem, wherein the dual-server storage system is coupled to a host, and wherein the first node and the second node are communicatively coupled to a key server; and
   transmitting, a request for an encryption key to the key server, from one or more nodes of a set comprising the first node and the second node, in response to exclusively securing a common lock that is available, wherein the encryption key is to be shared between the first node and the second node in the dual-server storage system, wherein enforcing exclusive possession of the common lock prevents race conditions that create conflicting encryption keys between the first node and the second node, and wherein the encryption key is used to encrypt data from the dual-server storage system comprising the primary storage subsystem to the secondary storage subsystem.

14. The computer program product of claim 13, the operations further comprising:
   determining whether the common lock is secured; and
   in response to determining that the common lock is not secured, placing one of the first node and the second node in a wait queue.

15. The computer program product of claim 14, the operations further comprising:
   sharing the encryption key between the first node and the second node, prior to releasing the common lock.

16. The computer program product of claim 15, wherein the common lock is stored in the first node which is a master node in the dual-server storage system, wherein the second node is a partner node in the storage system, and wherein the partner node secures the common lock stored in the master node when the common lock is made available to the partner node.

17. The computer program product of claim 16, the operations further comprising:
   in response to securing the common lock, avoiding sending another request to the key server if the encryption key is already found in a local key store.

18. The computer program product of claim 17, wherein:
   if the first node is not operational then the second node requests the key server for the encryption key as the second node is operating as the master node and has the common lock.

* * * * *